United States Patent
Hall et al.

(10) Patent No.: US 10,218,594 B2
(45) Date of Patent: Feb. 26, 2019

(54) INTERMEDIATE-RANGE MULTI-CHANNEL WIRELESS DEVICE FOR VARIABLE INTERFERENCE ENVIRONMENTS WITH ADAPTIVE REDUNDANCY AND PATIENCE INDICATORS

(71) Applicants: David R. Hall, Provo, UT (US); Mark Hall, Springville, UT (US); Craig Boswell, Draper, UT (US); Everett D. Robinson, Pleasant Grove, UT (US)

(72) Inventors: David R. Hall, Provo, UT (US); Mark Hall, Springville, UT (US); Craig Boswell, Draper, UT (US); Everett D. Robinson, Pleasant Grove, UT (US)

(73) Assignee: Hall Labs LLC, Provo, UT (US)

(*) Notice: Subject to any disclaimer, the term of this patent is extended or adjusted under 35 U.S.C. 154(b) by 0 days.

(21) Appl. No.: 15/444,798

(22) Filed: Feb. 28, 2017

(65) Prior Publication Data
US 2018/0248779 A1   Aug. 30, 2018

(51) Int. Cl.
*H04L 12/26* (2006.01)
*H04W 24/08* (2009.01)

(52) U.S. Cl.
CPC ......... *H04L 43/0852* (2013.01); *H04L 43/10* (2013.01); *H04W 24/08* (2013.01)

(58) Field of Classification Search
CPC . H04L 43/0852; H04L 43/0817; H04L 43/10; H04W 24/08; H04W 4/005; G06F 21/602
See application file for complete search history.

(56) References Cited

U.S. PATENT DOCUMENTS

| | | | |
|---|---|---|---|
| 2015/0055552 A1* | 2/2015 | Tarighat Mehrabani | ........... H04L 7/0331 370/328 |
| 2015/0356498 A1* | 12/2015 | Casanova | ........... G06Q 10/087 705/13 |
| 2016/0219024 A1* | 7/2016 | Verzun | ........... H04L 63/102 |

* cited by examiner

*Primary Examiner* — Edan Orgad
*Assistant Examiner* — Nourali Mansoury

(57) ABSTRACT

Disclosed herein are low data rate electronic devices capable of wireless communication at ranges of thousands of meters. These devices may be such things as keypads, door latches, occupancy monitors, sprinkler controllers and others in a campus or a collection of buildings. Devices may measure the quality of a communications link on a channel, and apply varying levels of redundancy based upon a recent history of success and failure of packet transmission to other distant devices, which measurement may be a value of badness increased as errors are encountered and decreased as packet communication is successful. Devices may include an exterior indicator as to the present latency in communication, permitting an expectation of how patient a user should be before finding an error has occurred. Detailed information on various example embodiments of the inventions are provided in the Detailed Description below, and the inventions are defined by the appended claims.

20 Claims, 7 Drawing Sheets

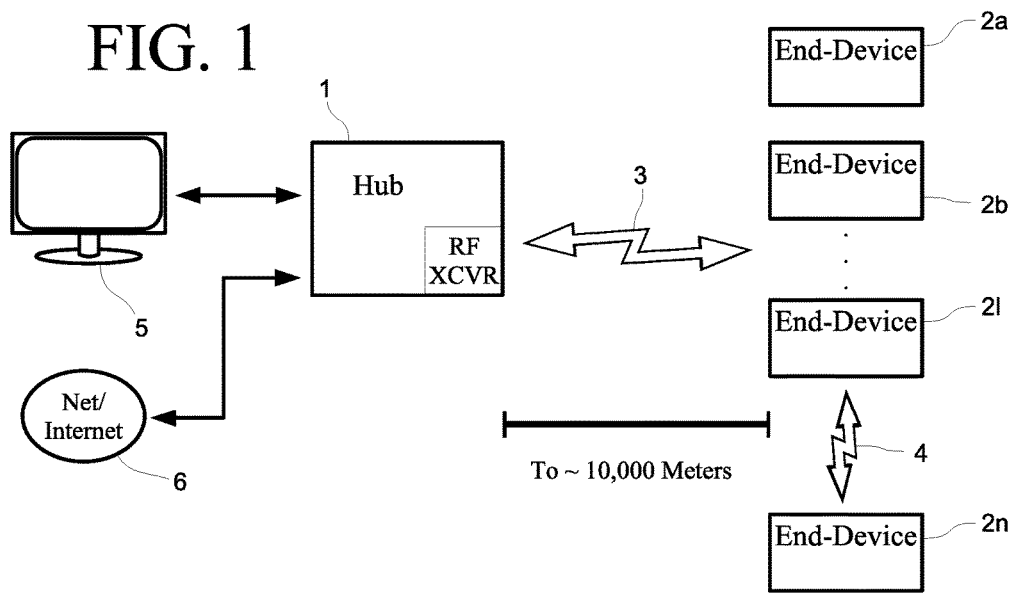
FIG. 1
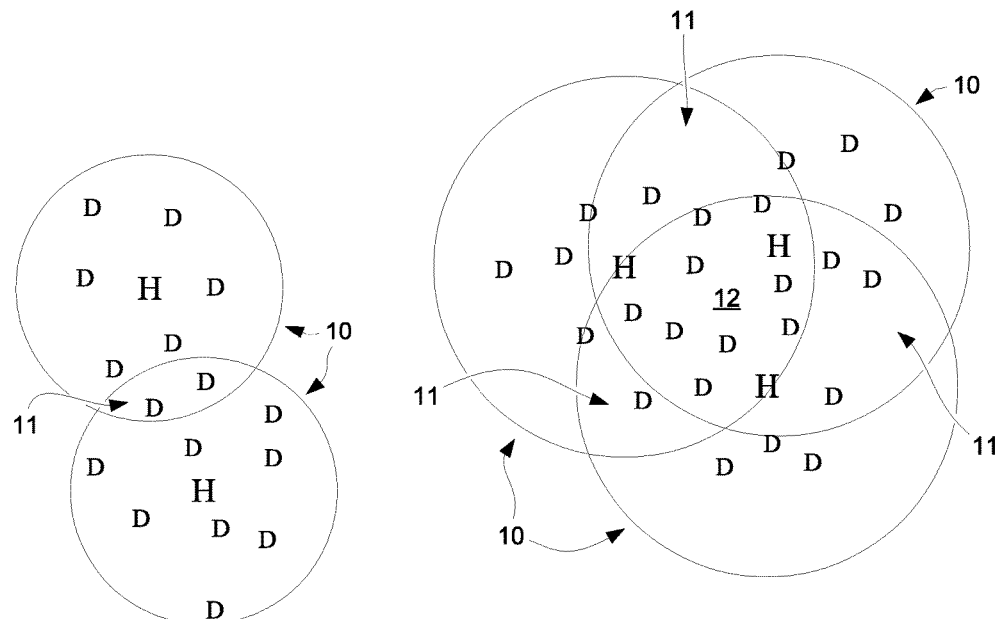
FIG. 2
FIG. 3

FIG. 4
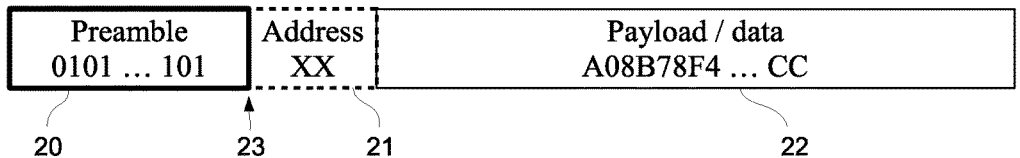
FIG. 5
| $S_i$ | Freq. |
|---|---|
| $I_0$ | $F_a$ |
| $I_1$ | $F_b$ |
| $I_2$ | $F_c$ |
| . | . |
| . | . |
| . | . |
| $I_n$ | $F_n$ |
FIG. 7
| Channel | FS | SF | BR |
|---|---|---|---|
| 0 | 0 | 6 | 25 |
| 1 | 1 | 7 | 12.5 |
| 2 | 2 | 6 | 25 |
| 3 | 3 | 7 | 12.5 |
| 4 | 4 | 6 | 25 |
| . | . | . | . |
| . | . | . | . |
| . | . | . | . |
FIG. 6
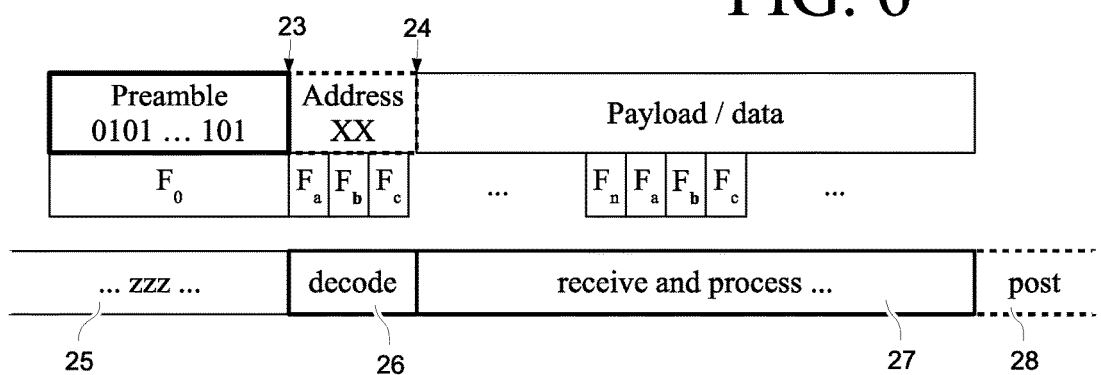

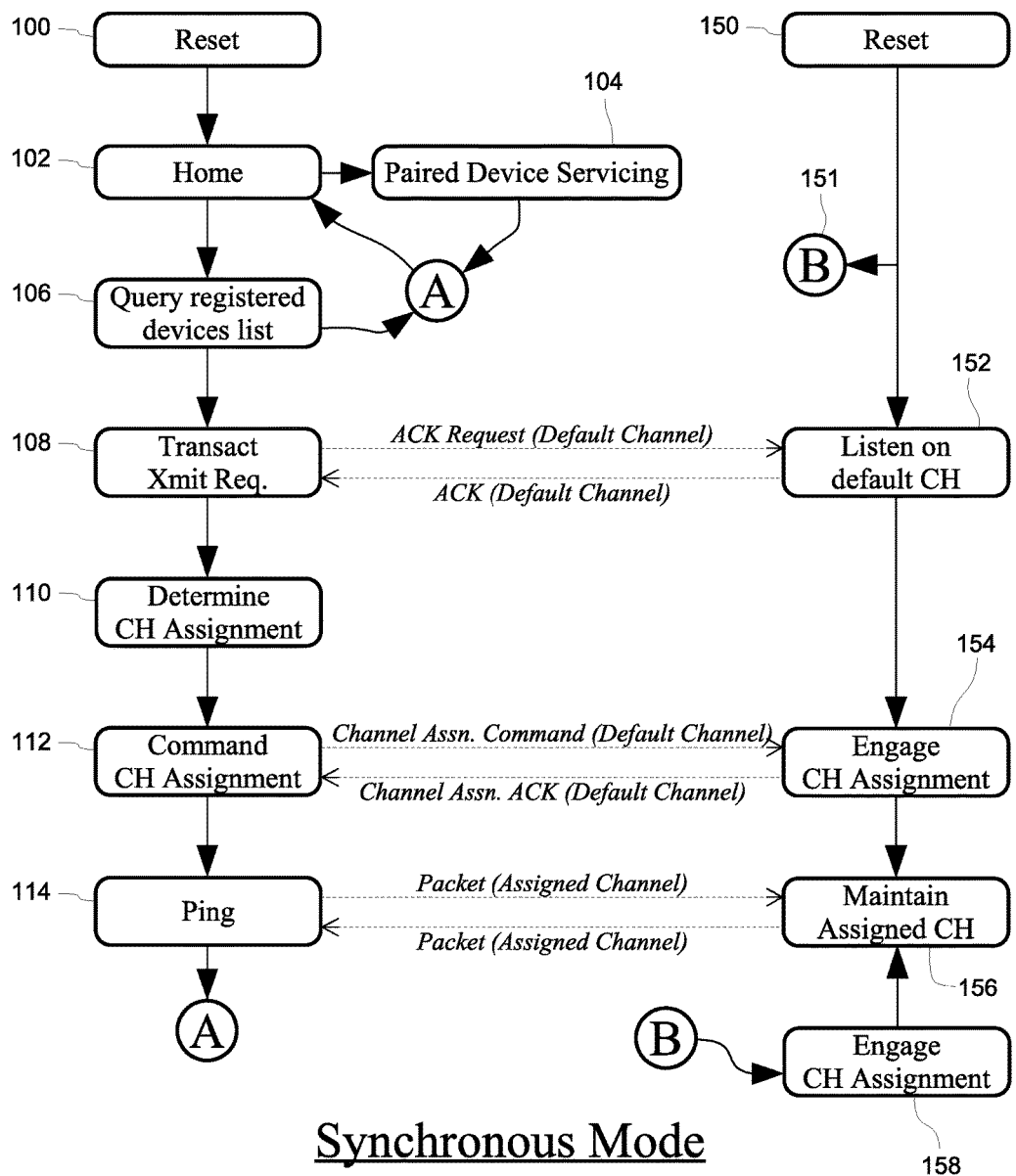

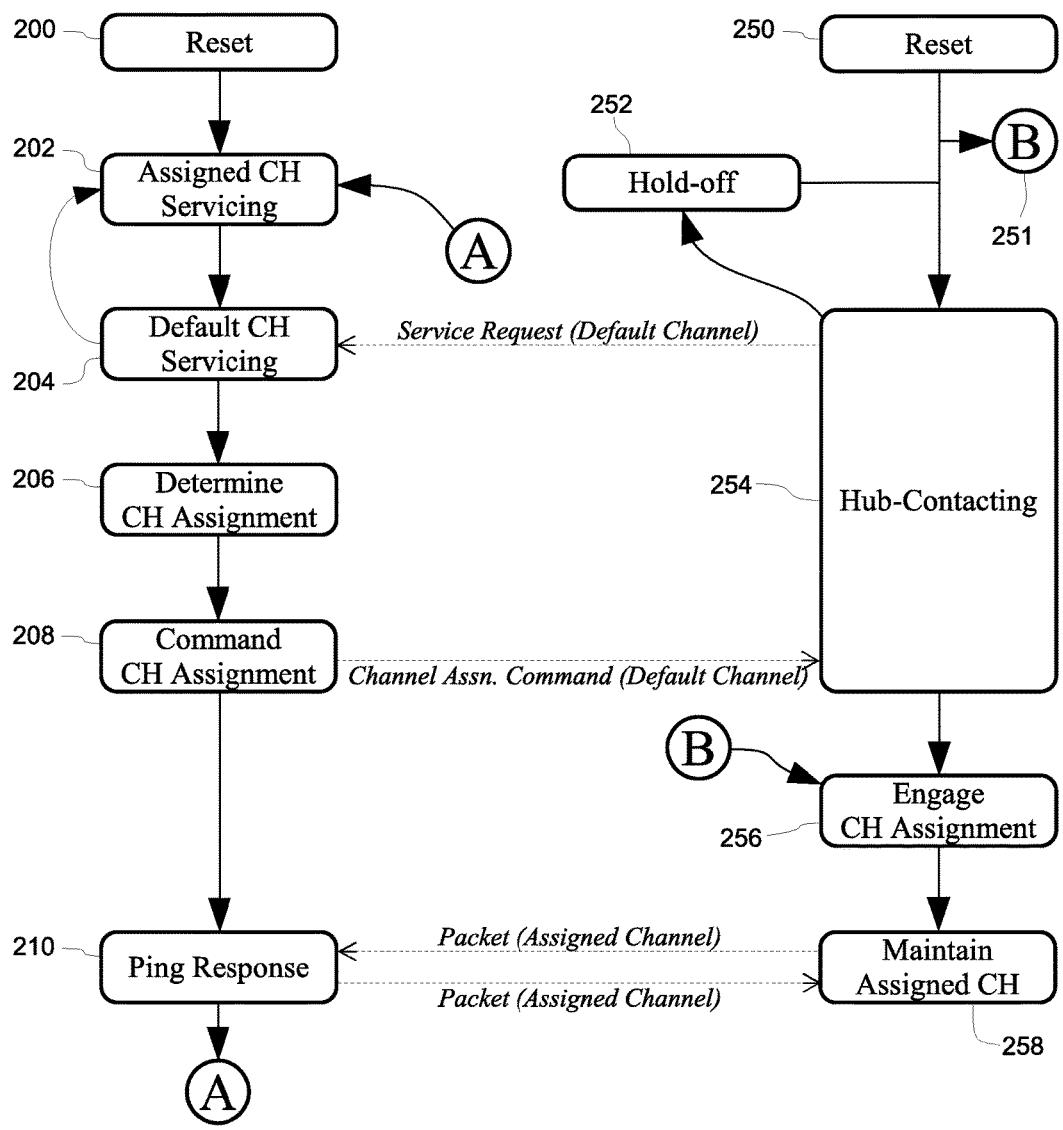

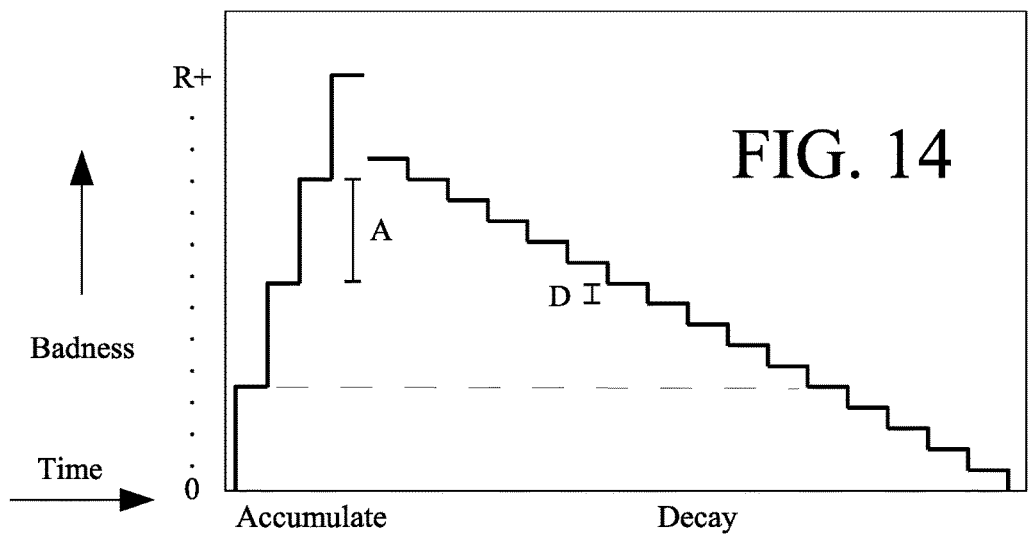
FIG. 14
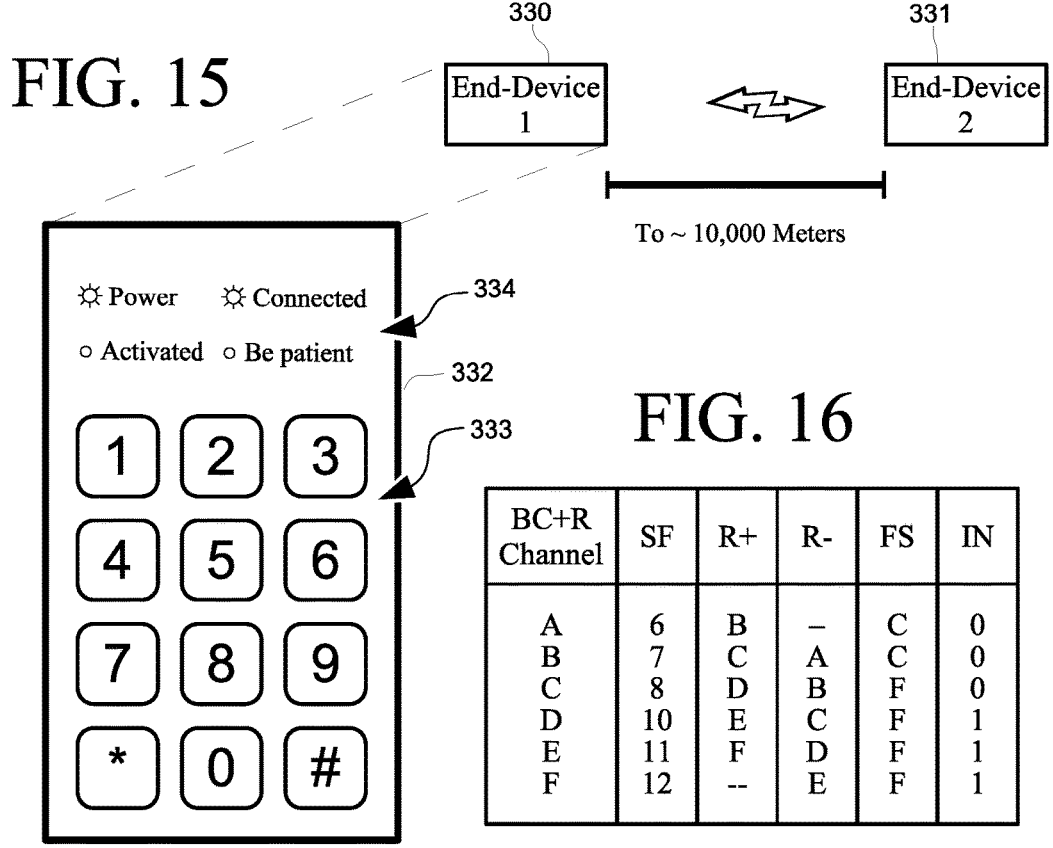
FIG. 15
FIG. 16

INTERMEDIATE-RANGE MULTI-CHANNEL WIRELESS DEVICE FOR VARIABLE INTERFERENCE ENVIRONMENTS WITH ADAPTIVE REDUNDANCY AND PATIENCE INDICATORS

BACKGROUND

In recent history, relatively inexpensive electronic devices have become available to ordinary property-owners that wish to monitor and control various aspects of their properties. A recent concept called the "Internet of Things" imagines home-related electronic devices that can be reached through the Internet, by which an environment can be controlled, e.g. lighting, temperature, digital video recorders, and many other "smart" devices. That kind of device ordinarily requires a connection to a network switch or hub, which connection can be wired or wireless.

Wireless connections to such smart devices are often desired, particularly in existing constructions, avoiding the laying of wires in existing walls and other structures. Technologies serving this purpose include low-wattage devices that communicate using the 2.4 GHz 802.11b/g "WiFi" protocol, and other more-recent and similar protocols such as Zigbee and Z-Wave. These protocols generally permit data rates of 100 k bytes per second or more, allowing for devices that transmit and forward audio and video data in substantial real-time. However with high data rates come a vulnerability to interference from other devices operating on the same radio bands, and accordingly devices using these short-range protocols are generally limited to service within a single residence or building within a distance of less than 100 meters.

Recent technologies have been developed that permit operation to an intermediate range, communicating between points that are several miles or more away, for example using the LoRaWAN protocol. In this type of network, interference reduction is achieved by using frequencies in the UHF band and by including redundancies in communication, using for example multiple sampling, multiple frequency (spread-spectrum) techniques, and/or error-tolerant protocols. The use of the UHF band avoids interference from over-the-horizon sources, while at the same time avoiding some attenuation-of-signal from water-vapor, precipitation, buildings and other physical obstructions. These redundancies and protocols necessarily reduce the data throughput such that audio and video data cannot be streamed in good quality or in real-time.

An exemplary use of intermediate-range communication is in the recent deployment of wireless utility meters. Having a utility meter that can be read without a person traveling to and visually looking at it is a substantial cost savings for a utility. For such a use a meter communicates two items of information, which are an identifier for the meter and the meter reading itself; the utility takes a pair of such items and generates a bill for a utility subscriber. Because utility bills are ordinarily generated once per month, the amount of data from a single meter is usually on the order of a few tens of bytes in that period. Thus tens or even hundreds of thousands of meters can share a single intermediate-range channel, largely without interference from other devices.

The unsuitability of existing systems at intermediate ranges for large numbers of devices, for example in the Internet-Of-Things, is an unsolved problem. Turning now to FIG. 2, two proximal short-range networks are conceptually shown, such as those constructed from devices communicating through the 802.11g protocol, for example using the Zigbee specification. In the example two property owners each operate a hub "H" servicing multiple devices "D", and as shown in the figure the circumference of effective communication 10 of each hub is proximal so as to create a zone of interference 11. Communication with the devices in that zone can be affected by communications with a non-subscribing hub, so as to introduce possible packet transmission collisions and interference. However, because these networks are short-range, the zone of interference 11 is relatively small, and the frequency of collisions and interference is likewise negligible. Proximal operators of such networks can experience impacts, but because of the short-range and the short transmission time of packets, these impacts are minor and usually acceptable.

In contrast and as shown in FIG. 3, three intermediate-range networks are located in similar proximity, each with a hub "H" and subscribing devices "D". Because of the greater distance of communication provided, most devices "D" are located in zones of interference 11, and many devices may be located in regions 12 where several hubs are located within range. Thus where intermediate-range networks are to be used, most communication between hubs and devices and also inter-device communications should be expected to take place under conditions of interference, especially when located within a city or other populated area. Utility meter reading and other existing installations using the LoRa or LoRaWAN protocols manage this congestion by being the only network in the radio locality on a particular frequency, and by infrequent packet transmission on the order of once per week or month such that collisions between devices aren't likely. Utility meters are configured and installed by the utility provider, who can limit the number of end-devices within a locality to ensure network reliability. Because the provider is the only consumer of the applicable bandwidth resources, it can effectively control interference and manage congestion.

Unavailable on the consumer market today are hubs and end-devices that can operate at intermediate ranges. The short-range "WiFi" 802.11b/g network is now so popular that in most urban areas there is a router within communicative range no matter where a person finds himself; most households using the Internet now have one, purchased from a retailer. If the range of those routers and the devices they service were to be extended to an intermediate range, the result would be a collapse of system functionality from overwhelming interference. Thus, in order to bring intermediate-range devices to the ordinary consumer, further development is needed.

The existing intermediate-range techniques, however, aren't conducive for applications where interactivity is need. For a channel sharing thousands of meters, it isn't necessary to resolve collisions between devices in a matter of milliseconds, because data transmissions can be delayed without significant impacts. In another example, an irrigation controller will ordinarily keep a set of sprinklers on for minutes at a time, and a delay of multiple seconds or even minutes is tolerable. In contrast, a person activating a light switch, for example, will not accept activation of lights with perhaps more than a one-second delay. Where a person enters a code on a keypad to enter a building, he expects a controlled lock to deactivate in real-time. In general, the existing intermediate-range technologies are fault-susceptible and not reliable for such interactivity, particularly where multiple devices share a common communications frequency or channel.

Interactivity issues for battery-powered devices can be even worse. For these devices, it is generally undesirable to keep a receiver continuously powered, and worse to repeatedly being awakened from a sleep mode to process and discriminate packets destined for other devices. The LoRaWAN Class A and B protocols address this by having end-devices turn off their receivers for long periods of time, waking up periodically to interact with a network gateway. Such a device may remain asleep for seconds, minutes or even hours, and thus cannot be made responsive to incoming queries. Furthermore, these protocols are susceptible to collisions from co-transmitting devices, which may require backing off interactions with a hub, and no time of reception can be guaranteed. Thus absent from the field of the invention is a system that can provide adequate and reliable service for groups of sensed and controlled remote devices at intermediate ranges.

BRIEF SUMMARY

Disclosed herein are low data rate electronic devices capable of wireless communication at ranges of thousands of meters. These devices may be such things as keypads, door latches, occupancy monitors, sprinkler controllers and others in a campus or a collection of buildings. Devices may measure the quality of a communications link on a channel, and apply varying levels of redundancy based upon a recent history of success and failure of packet transmission to other distant devices, which measurement may be a value of badness increased as errors are encountered and decreased as packet communication is successful. Devices may include an exterior indicator as to the present latency in communication, permitting an expectation of how patient a user should be before finding an error has occurred. Detailed information on various example embodiments of the inventions are provided in the Detailed Description below, and the inventions are defined by the appended claims.

BRIEF DESCRIPTION OF THE DRAWINGS

FIG. 1 depicts a network topology utilizing multiple end-devices and an interactive hub, wherein end-devices may maintain interlinks to each other.

FIG. 2 depicts potential interference in two proximal short-range wireless networks.

FIG. 3 depicts potential interference in three proximal intermediate-range wireless networks.

FIG. 4 shows an exemplary wireless data packet structure that includes a preamble and a variable payload.

FIG. 5 illustrates an exemplary frequency-sequence table usable in digital spread-spectrum communications between a hub and an end-device.

FIG. 6 depicts typical power states of an end-device through the course of reception of one kind of intermediate-range wireless packet.

FIG. 7 shows an exemplary set of discrete and orthogonal wireless channels for communication between a hub and a set of end-devices.

FIG. 10 depicts a typical set of states for a hub and an end-device being configured from a default initialization channel in synchronous mode to operate on an assigned channel.

FIG. 11 depicts a typical set of states for a hub and an end-device being configured from a default initialization channel in asynchronous mode to operate on an assigned channel.

FIG. 14 illustrates the behavior of a badness value in the presence of extreme interference and clearance as determined by several settings.

FIG. 15 shows a pair of intermediate-range devices, one of which includes a keypad and a "be patient" indicator.

FIG. 16 illustrates a table or scheme of sub-channels having present determinations for a "be patient" indicator.

DETAILED DESCRIPTION

Figure 8:
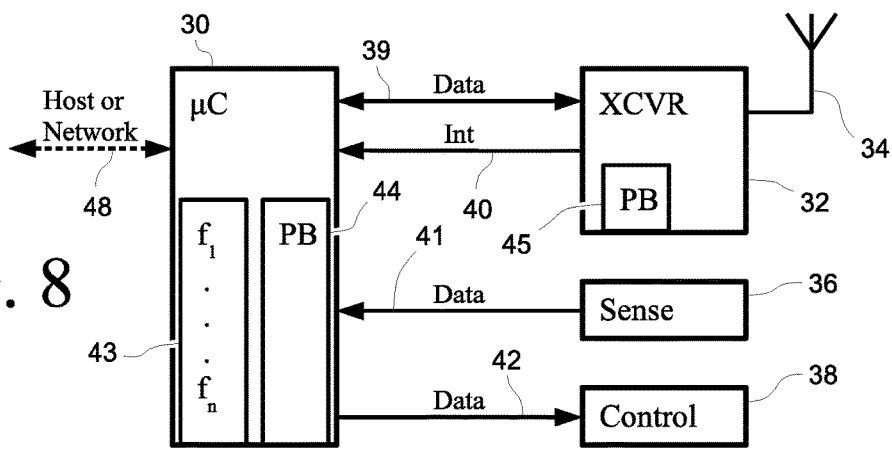
FIG. 8 shows an exemplary circuit architecture suitable for an ordinary end-device.

Shown in FIG. 1 is an exemplary intermediate system employing a hub-type topology that permits device-to-device communication as well. A hub 1 is placed within wireless range of end-devices 2a-n, communicating 3 over the airwaves at a distance of up to 10 km or more, depending upon environmental conditions. In many cases, end-devices 2 are electronic devices that accept commands and transmit information to a controlling hub 1. Included in hub 1 and each of end-devices 2a-n is a processor, software for performing the functions of the device, and an RF transceiver. Hub 1 could be an ordinary personal computer with an RF adapter or card installed, or it might simply look like a box with an antenna and a port or interface permitting configuring and monitoring; it is foreseen that a manufacturer would likely supply a hub 1 in a ready-to-use state such that an installer need not open its case or install any software. In one configuration, hub 1 is connectable to a personal computer 5, for example through a USB interface, computer 5 having installed thereon software functional to configure and monitor the hub 1. In another configuration, hub 1 has a network port whereby communications may be had with network 6. These communications may be through any conceivable type or protocol. In one example a hub 1 sends messages through a TCP/IP sockets-based protocol to a proprietary server existing on the network 6. In another example, hub 1 has software that permits it to be seen as an HTTP server from any device on network 6. Thus in some installations, hub 1 may be connected directly to and accessible from the Internet, allowing for access from any Internet-connected device. The antenna of hub 1 will typically be elevated and located in an obstruction-free locality to maximize signal-strength with end-devices 2.

End-devices 2 are preferably manufactured in an unconfigured state, ready for pairing with a hub 1, each device having a unique identity (UID) to discriminate it from others. Such end-devices 2 can be of varying types, providing many kinds of control and sensing functions. In one example, an end-device has an infra-red motion sensor built in, includes programming to record the time of the last motion event, and may also include programming to initiate a notification packet to a hub 1 upon a motion-sensing event. In another example, an end-device includes a keypad whereby a person can enter a code, upon which a message is sent to hub 1 containing a sequence of keypresses. Such an end-device may be paired with another device which activates and deactivates a door latch, by way of messaging from hub 1, and the hub contains programming and configuration to read the keypad end-device and control the latch end-device as correct codes are entered. In a further example, several end-devices 2 are located throughout a building, sensing the temperature at various locations. Another end-device 2 controls a central-air system, providing heating and cooling to the building at the direction of hub 1 without human intervention based upon thermostat data forwarded through hub 1. The kinds of end-devices 2 that can be employed are virtually limitless, so long as they are electronic and provide either a control or a sensing function while staying within the available data throughput limitations.

Further in FIG. 1, end-devices 2l and 2n are configured to communicate directly over a channel 4 without interaction with hub 1 and channel 3, performing inter-device communication. In one example of this, device 2l is a keypad communicating commands to open a door latch controlled by device 2n over proximal channel 4, avoiding the potential latencies introduced at channel 3 which may be crowded or suffering from the effects of a hub operating at a distance from these devices. End-devices of this kind can interact with hub 1 in several ways. Hub 1 may maintain full interaction and control of this kind of inter-communicating devices, monitoring them, keeping status and communicating device commands, for example using a network interface over network 6. Where such interactivity is not needed, hub 1 may provide an initialization function for inter-communicating devices, providing communications channel setup and inter-device configuration. In the example of the keypad and door latch, device 2l may be configured to send packets with the address of device 2n, over a communications channel selected by the hub 1. Such configuration may be through the use of a default initialization channel, described below.

Although the example shown in FIG. 1 includes a hub, that isn't required for inter-device communication and operability. An end-device 2n may be configured to operate with a hub present, with another paired end-device 2l present, as desired. Devices can be configured, for example at the time of installation, with communications parameters, protocols and procedures, although it may be preferred to have a hub present for that setup to avoid cumbersome steps by the end-user. Where communications channel 4 is reconfigurable, it is preferable to have a fail-safe configuration to fall back upon in the event of desynchronization or other error.

Intermediate-Range Packets and Transferrence Basics.

REVIEW. Described herein are electronic devices that are functional at intermediate ranges even in populated or congested areas, providing for simple installation by an ordinary home- or business-owner, as will presently be described and shown. These devices can be made reliable enough to use in failure-intolerant situations, such as security systems, even where an RF spectrum is congested. Remote devices can be made to operate on battery power, use low-power transmitters, and in many cases made to operate through the sending of a single bit per packet. Equipment can be made to fit in a hand-held enclosure, e.g. with a small omnidirectional antenna operating in the UHF frequency band. It is sometimes the case that a low-data rate network device will be desired to be placed in a location where power is available, but where neither network cabling nor a WiFi network is available. This kind of application is particularly suitable for intermediate range equipment. One kind of intermediate-range technology is known as "LoRa", descriptions of which are publicly available from the LoRa Alliance of San Ramon, Calif., which maintains a website at www.lora-alliance.org.

Shown in FIG. 4 is the structure of a simple data packet which may be used in communication between a hub and an end-device, a sub-type of which is used in the LoRa protocol. The structure has three parts, which are a preamble 20, a data payload 22, and an optional address 21. Payload 22 is generic and can contain many kinds of data as desired, depending upon the functions provided by an end-device. Payload 22 will often contain a command or a response, for example a command to open a latch or a response that a power switch is presently in an "on" state. Address 21 discriminates between devices operating on the same communications channel, and may not be needed where a single hub and end-device pair are the sole devices operating on that channel. (A description of what defines a channel appears below.) Preamble 20 is present to provide synchronization for a radio-frequency receiver, at a hub or an end-device, at a programmed frequency such that the receiving device can decode the contents of the packet. A preamble is preferably a fixed, identifiable and unnatural pattern that can be recognized by a simple state machine without starting a general-purpose processor. The packet structure of FIG. 4 can be transmit using many modulation techniques; LoRa devices use frequency shift keying for interference immunity, although other modulations can be used in accordance with the dictates of a particular operating environment.

Packets can be transmit over a single carrier frequency, if desired, but because of benefits including resistance to noise and reduced impacts on particular parts of a frequency spectrum, spread-spectrum modulation has become popular. In this modulation technique, a sequence of frequencies is provided at a transmitter and a receiver; although in traditional encrypting systems the sequence might be generated by a pseudo-random generator with a secret seed and function parameters (which still can be used), for noise resistance and spreading of Tx power all that is needed is a sequence of frequencies uniformly spread over a given available set. This can be accomplished by the inclusion of a table as shown in FIG. 5, containing a sequence of n frequencies. In the example, each frequency $F_x$ is indexed by a sequence number $I_n$, such that the current operational frequency can be determined as a function of time from a point of synchronization, for example the end 23 of the preamble of a packet as in FIG. 4. The arrangement of frequencies in a sequence may be incremental, random, or in any order desired, keeping in mind that use of each frequency an equal number of times will result in the desired uniformity.

The transmission of a packet using this modulation technique is as shown in FIG. 6, beginning with the preamble at a known initial frequency $F_0$. The preamble is preferably not just a square wave, but a pattern whereby synchronization point 23 can be positively determined. The transmitter then sequences through the frequencies at a known period, mirrored by the receiver. For noise and interference immunity the sequence period is preferably much shorter than the time needed for each bit or symbol, but longer periods can be used to achieve a spreading of power across a spectrum. The sequence period should preferably be much shorter than the time of preamble transmission, such that preambles are easy to distinguish.

The power consumption of a transmitter is necessarily high during packet transmission, most of the power likely being consumed by the Tx output stage circuitry. A receiver, on the other hand, can implement a power-conserving procedure. Referring again to FIG. 6, the processor of a receiving device maintains itself in a state of sleep 25 while processing and receiving activities aren't underway; this can be particularly important for certain kinds of devices, especially for end-devices reliant upon battery-power, such as those with solar cells. A receiving device has built thereinto its receiving circuit an automated preamble recognizer; when recognition occurs a signal is sent to a processor to awaken and enter an active state of packet decoding 26. In the example of FIG. 6 an address is used, and the receiving processor performs functions needed to determine if the address in the packet is for its device. If an address is decoded and the packet is determined to be destined for another device, the processor can reset and go back to a sleeping state 25. For maximal power savings, therefore, an address is preferred to be toward the front of a packet, where it will be transited across a channel first before a data body. Where an address is matched, or where an address isn't used, a processor enters states of receiving and processing incoming data 27 and post-receipt processing 28 as needed. So in order to keep the processor of a particular device in a non-active state, it is important to positively discriminate the receipt of preambles of packets directed to the device from the preambles of other devices.

Multi-Channel Intermediate-Range Implementations.

Existing intermediate-range networks use a common initial DSS frequency and/or channel for communications with devices in that network. This method has the advantage of making setup extremely simple. By this method, other networks may use other initial frequencies or channels, thereby discriminating between members of their respective networks. As such networks change to include interactive devices or grow to large numbers of member devices, the possibility of congestion, collisions and interference becomes a greater concern.

Now turning to FIG. 8, a basic circuit is shown typical of many present intermediate-range network devices, which can support either single- or multiple-channel operation. The main parts of this circuit are a microcontroller 30 and an RF transceiver 32, which is connected to an antenna 34 located in a position to provide clear communications to other devices. A transceiver 32 may be essentially some analog radio-frequency circuits combined with a logic state machine that permits automatic operation for all or part of a packet transmission or reception. The use of transceiver 32 may leave the microcontroller 30 with additional processing capacity for such things as reading sensors, managing control circuits, etc., which may happen at the same time that packets are transiting a communications channel. Communication between the microcontroller and the transceiver is by way of data lines 39 and interrupt lines 40, by which microcontroller 30 manages the functions of transceiver 32 and transfers packet information received and to be sent. Transceiver has a packet buffer 45 sufficient to store all or part of a single packet, read- and write-accessible through data lines 39. Data lines 39 can be varied according to need or capabilities of a transceiver used, while interrupt lines 40 signal to the microcontroller events such as the start or completion of reception of an incoming packet. Were transceiver 32 to be a Semtech SX127x (introduced below), for example, data would be transferred by way of a single-bit wide serial bus using address locations to control registers and access a packet buffer, and data lines 39 would include single lines for in, out, clock and sync. In that example, a packet completion interrupt would be generated by a transition on the DIO0 line. When transceiver 32 is configured for operation on a channel orthogonal to those used by other end-devices, such interrupts would not occur when those end-devices communicate and microcontroller 30 would be left free to sleep or engage in other processing activity.

Microcontroller 30 also contains a packet buffer 44, which is typically larger than the transceiver buffer 45. As packets are to be transmitted, the microcontroller transfers them to the transceiver by way of data lines 39, typically one at a time. Packets received are correspondingly transferred from buffer 45 over the data lines and stored for processing in buffer 44. Apart from this packet data, setup commands are also be sent by microcontroller 30 to program the transceiver for proper operation on a channel, once at initialization for single-channel operation and subsequently with or between packets where more than one channel is used. Where microcontroller 30 has been programmed for multi-channel operation, each packet within buffer 44 may carry with it a channel on which it is to be sent, or parameters thereof.

In an implementation using the Semtech SX127x and digital spread-spectrum, microcontroller 43 also contains a frequency table 43, as described above for FIG. 5. For that implementation, the transceiver 32 has storage only for two frequency settings, which are the one presently in use and the one to be used when it is time for a hop to a new frequency. The transceiver generates interrupts to the microcontroller indicating it is ready to receive the new frequency setting, which is subsequently sent over data lines 39 before the frequency hop is to occur. An alternate configuration would put frequency table 43 entirely on the transceiver 32, but for this example a simplified transceiver is used that does not.

Where a transceiver 32 and microcontroller 30 pair is incorporated into an end-device, at least one of a sensor 36 or a controller 38 will be included. Sensor 36 could be virtually any sensor, examples of which are a temperature probe, a keypad, a lighting sensor, an entryway closure detector, a motion detector, and a camera. Controller 38 could control a latch, a power switch, a thermostat, a motor speed controller, and many other things. Sensor 36 and controller 38 are connected to microcontroller 30 through data lines 41 and 42, which lines may be of any needed configuration, analog or digital. Where a transceiver 32 and microcontroller 30 pair is incorporated into a hub, sensor 36 and controller 38 may be omitted. Instead, a connection to a host processor or network 48 would be included, permitting configuration of and interactions with end-devices at intermediate-range.

While functioning as an end-device, one microcontroller 30 paired with one transceiver 32 are sufficient to operate in an ordinary way. Transceiver 32 is capable of being configured for a desired channel and transmitting or receiving packets to and from a hub, though not at the same time. End-devices do not typically have a need to do both concurrently, so this is usually not an issue. However there are advantages to incorporating multiple transceivers in a hub, as will be presently explained.

Figure 9:
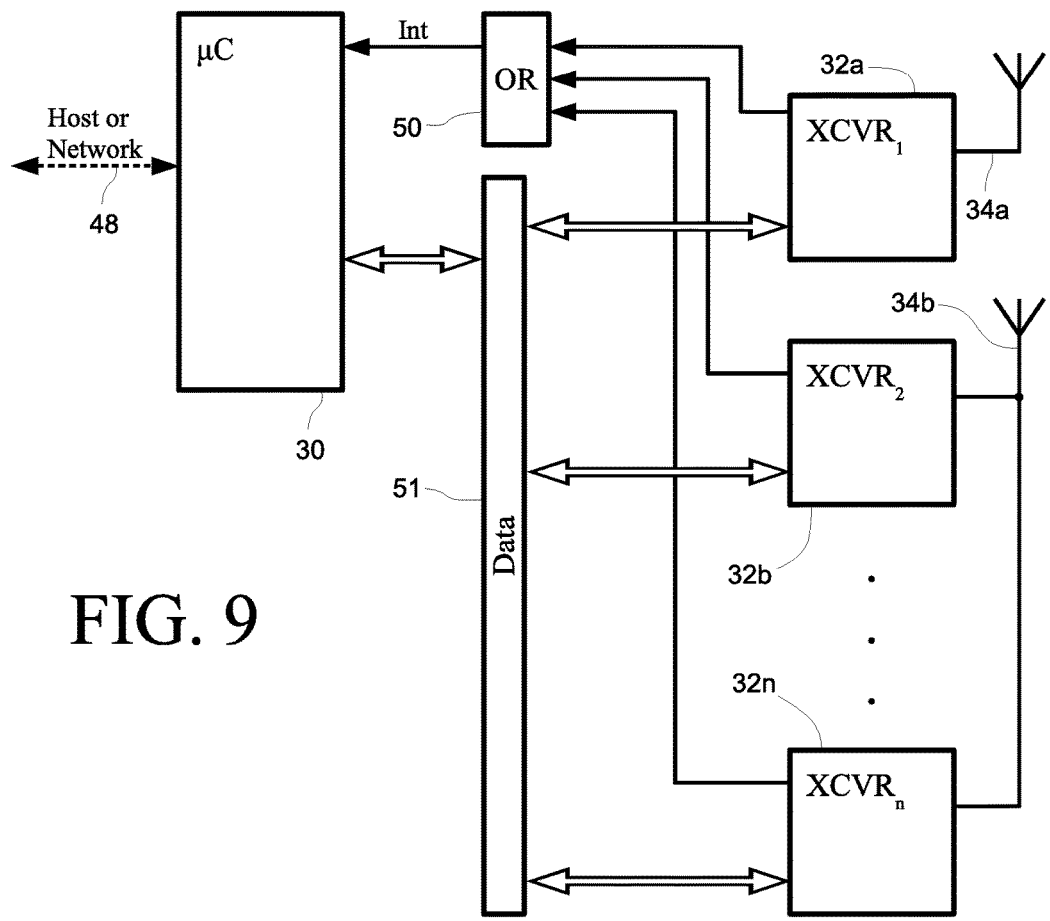
FIG. 9 shows an exemplary circuit architecture suitable for a hub having one transmitter and a number of receivers for simultaneous operation on differing channels.

FIG. 9 illustrates one configuration that may be used in a hub, providing multiple transceiver functionality. Here a microcontroller 30 is connected ton transceivers 34a through 34n by way of an interrupt gate 50 and data bus 51. Included within data bus 51 is sufficient multiplexing circuits to allow the microcontroller 30 to individually address each transceiver. In the example where the Semtech SX127x transceivers are used, this may be done by dropping the NSS pin of the individual transceiver to be attended to. Interrupt gate 50 combines the interrupt signals of each of the transceivers such that any interrupt in the group interrupts the microcontroller, and code therein can identify the particular transceiver flagging the interrupt and take appropriate action. In the drawing gate 50 is an OR logic gate, which suffices when all interrupt lines are low in a normal (non-interrupt) state; gate 50 could be AND logic gate if the reverse were true (lines normally high with low signal indicating an interrupt), or gate 50 could be a combination of logic circuits if needed. Now in practice it may be there are a sufficient number of interrupt inputs and general I/O pins on microcontroller 30 such that gate 50 and bus 51 aren't needed, particularly where the number of transceivers n is kept small, allowing for the microcontroller to communicate using parallel lines duplicating the setup and methods of FIG. 8.

The exemplary hub of FIG. 9 has the capability of transmitting and receiving wirelessly with end-devices at the same time, through antennas 34a and 34b. Antenna 34b is connected as an input to each of transceivers 32b through 32n, allowing each transceiver to receive on a different channel as programmed from the microcontroller 30. Depending upon the type of transceiver used, each transceiver may be isolated through filters and amplifiers (not shown) such that the proper impedance at the operational frequency range is preserved. Note that such a tying of transceivers to a common antenna makes them ineffective for concurrent operations in a transmitting mode; therefore microcontroller 30 would be configured to keep them in receiving-mode only. In contrast antenna 34a and transceiver 32a are configured to transmit and receive, having no sharing of antenna resources. Consideration should be given to shielding and to the distance between an antenna that may be used for transmitting and others that may be used for reception, such that potential interference is avoided.

The example shown in FIG. 9 has the capability of transmitting and receiving at the same time, with n−1 receivers monitoring one channel each. Transceiver 32a can be transmitting while all of 32b-n are ready to receive packets as they may transit n−1 channels. Microcontroller 30 may use the transceiver capable of free transmit operation 32a to perform interactive communication with an end-device without channel reprogramming, alternating between sending and receiving over the same channel. Alternatively, when using interactive communication with a particular end-device, microcontroller 30 may command transceiver 32a to switch to different channels as needed for transmissions to other end-devices, allowing one of transceivers 32b-n to receive the next packet from the particular end-device. If this is done, it is preferred that any transceivers configured to receive on the same channel be turned off, so as to avoid the discarding of packets produced at the hub. Assuming interactions with an end-device are symmetric (packets to and from an end-device alternate and are of the same length), in theory the setup shown in FIG. 9 will support up to two concurrent interactive sessions with two end-devices while at the same time monitoring n−2 other lone-channel end-devices for alerting packets sent spontaneously, or more than that number of end-devices where such channels are shared (using the asynchronous mode described below, for example.)

In practice, the constraints on the number of transceivers that can be used will depend upon several factors. One of these is the speed of data bus 51 against the efficiency of commanding transceiver setup, and sending and receiving packet data. As most of the transceivers of the setup of FIG. 9 are used to receive, this limitation would be experienced in two main ways. First, it is possible to flood the system with incoming spontaneous packets such that they cannot be retrieved with sufficient speed across bus 51. The second way comes into play when single receivers 32 are each used to monitor multiple channels, for example when the number of monitored channels exceeds n−1. The reprogramming of a transceiver 32 across the bus 51 requires some time, and if that time exceeds the packet preamble length, packets will fail to be received. Where more than two channels are monitored by a single transceiver 32, the dwell time on a channel (to detect whether a packet transmission is in progress by an end-device) may further exacerbate this problem.

Another limitation of the setup of FIG. 9 relates to the use of a single transmitter. For example, interactive communication can be had with not more than two end-devices where that communication is symmetric. Thus if an event occurs that requires a simultaneous response to multiple end-devices, some of those responses may be delayed beyond a timeout period. This problem can be mitigated through the addition of more transceiver/antenna pairs, if those antennas can be placed at a sufficient distance from the receiving ones and if regulations allow. Note that although end-devices can be constructed with multiple transceivers, as in FIG. 9, it is expected that one transceiver will be sufficient for all but the most exceptional circumstances.

Wireless Channels, Orthogonality and Communications Principles.

A wireless frequency spectrum can be segmented into definite channels that reduce interference and avoid unnecessary receiver power-up events on non-destination devices. Such channels are preferably "orthogonal" to each other as well, meaning that communication on one channel is very unlikely or practically impossible to interfere with communication on another. In one of the simplest channel designation schemes, each channel is assigned a unique and available center frequency per channel, for example as was done on the now-obsolete analog television spectrum. A one-to-one relationship is made between transmitters and frequencies in a radio locality, and all devices are to use only their assigned spectrum and nothing outside. For example, the 902-928 MHz ISM band could be divided into 52 500 kHz-wide channels, or 208 125 kHz-wide ones. Given that an intermediate network supporting ordinary consumers might have a range of many kilometers and thousands of end-devices, that is considered an insufficient number to avoid interference. Therefore further methods of discrimination are preferably used.

Introduced now are certain transceivers made for the LoRa protocol, commercially available from Semtech Corporation, which are identified as the SX127x product line. Note that there are transceivers available from other manufacturers that are equally suitable; these Semtech ones are used in this description merely out of convenience as a basis for discussion. The SX127x products are designed to be coupled to a microcontroller handling communication channel configuration and packet management, and have settings for a carrier frequency, signal bandwidth and the number of "chips" per symbol (6 settings), a chip being the smallest datum used in communication. Each combination of those represents substantially a unique channel orthogonal to others, potentially permitting collision-free communication where there is no more than one transmitting device per channel. Using such combinations, two channels may share a common carrier frequency or DSS carrier sequence, while still maintaining orthogonality. Other settings can be used to make additional channels having "partially-orthogonality" including an address, a bit rate, a CRC rate, an encoding type (Manchester/whitening/none), and others according to the manufacturer specifications; note however that the use of partially-orthogonal channels can result in processor-awakening events for packets destined for unintended end-devices, although they can be greatly reduced.

Upon identification of a useful set of channel combinations, a table can be constructed as shown in FIG. 7, each channel having a unique combination of settings useful for communication. In this example, each channel is assigned a spread-spectrum frequency sequence (FS), a spreading factor (SF), and a bit rate (BR) of communication. In one configuration, available frequency sequences are spread evenly over channel assignments, such that the preamble for each channel is sparsely or uniquely used—that is a device transmitting a packet on an assigned channel would use the first frequency in the sequence while transmitting the preamble, followed by the use of other frequencies in sequence. Other channel combinations can be varied in accordance with needs present, for example a frequency sequence could be replaced with an operating frequency where spread-spectrum communication was not used.

Upon determining a set of channel combinations, assignments can be made for individual devices. Again some devices are tolerant of long latencies, and no special treatment of these is required. Other devices serve better being on a channel that is free or substantially free of conflicts. The assignment of a channel to a hub and an end-device requires a setting at both, and this could be made by a manufacturer or its representative at the time of installation.

Assignment of Operational Channels from a Hub.

Dynamic channel assignment is also possible, that is channel assignments made at the time of use rather than manufacture. One method uses a dedicated default channel and negotiation, by which channel assignments may be made substantially without an ordinary consumer, that is a property owner, electrician or maintainer with ordinary skills, applying configuration steps beyond plugging an end-device in and registering it in an intermediate network. A dedicated channel is selected from a list of available ones, where each end-device starts on or returns to when there is a lack of confidence in a present channel assignment. Particular channel assignments are managed by the hub to which an end-device is to be paired, which assignments can be by several means as discussed below. The procedure to which channel assignments are negotiated depends upon whether communications with an end-device are prompted or spontaneous, or in other terms synchronous or asynchronous with respect to hub communication on the default channel.

In synchronous mode, all communications from end-devices are made in response to a request or permission from a hub. A hub transmits a packet to each end-device in turn, granting (explicitly or implicitly) the end-devices a window in which to respond. In analogy, the hub acts as a chairperson to a room full of speakers, the chair deciding who should speak and when, each end-device only "speaking when he's spoken to". In asynchronous mode, an end-device sends a packet when it is ready, potentially at the same time as another end-device that causes a packet collision. A hub responds to an end-device with a packet acknowledging (again either explicitly or implicitly) receipt of the end-device's communication. After a time, if a transmitting end-device does not receive that acknowledgment, it may retransmit the packet as many times as needed. This is analogous to a room full of people who may potentially speak to a chairperson whenever they wish to "out-of-order". Either mode of communication can be used on a default channel, and indeed a hub can be designed that uses only one mode or switches between both, depending upon the need.

Now depicted in FIG. 10 are state-machine representations of a channel negotiation between a hub and an end-device using a synchronous mode, with successive states generally proceeding down the page. Each starts in a reset state on power-on, 100 and 150 for the hub and end-device, respectively. On reset 150 the end-device completes some initialization activity, after which one of two things happens. If the end-device has non-volatile memory and if a channel assignment is found to be stored therein, the device can skip 151 the channel assignment procedure and simply set up the communications hardware for the saved channel and resume operation as in step 158. Otherwise the device enters a state of listening for an acknowledgment request on the default initialization channel 152. The end-device may leave this listening state intermittently or as needed to manage other needs, as responding to such a request is not a critical action. As an acknowledgment request is first used by the hub to confirm communication in the moment, that request can be any packet that elicits an immediate response from the device, indicating it is in a state to receive a further command.

From initialization, the hub proceeds to a home state 102. The servicing of devices already paired will ordinarily take priority over pairing end-devices, and according in its ordinary operating state the hub will first determine whether there are any already-paired devices that need to be serviced. If so, the hub enters a servicing state 104, performs various activities depending upon the end-device type getting present attention and other factors, and returns home 102 when finished. Otherwise, the hub enters a query state 106 in which the list of registered end-devices is checked for ones that are needing to be paired with and possibly assigned to an operational channel.

Conceptually, the list of registered end-devices provides a way to give each hub awareness of which end-devices should be serviced, as there may be end-devices owned or operated by others within radio locality that should be ignored. On a hub, this list can exist by itself or as a part of other data or structures. In a synchronous mode, this list is most simply a list of unique identifiers (UIDs) by which intended end-devices may be recognized and addressed. Ordinarily this list will also contain a flag or information that indicates whether a device is paired, and the channel to which the device is assigned or the parameters thereof. This list may, if desired, keep other information such as device types, times of previous communications, battery information, servicing requests, error information and many other things. The hub provides a way to edit and reconfigure this list, such that the list may be changed as end-devices are added to or removed from a desired system. In one example, a hub contains a network port, an HTTP server, and server software that permits the editing of the list through a browser on a connected network computer. In another example, the list is maintained as a file on a memory device that can be inserted into the hub where it can be read. In a third example, the hub has a proprietary port and protocol permitting a technician access to the list from a specially-designed programming tool. And in a cloud-based example, the hub may make an Internet query at determined times for changes to be made to the list, adding newly registered end-devices or redacting ones as needed. The way in which the list of registered end-devices can be accessed may be widely varied according to the specific form of the hub and interfaces provided therein.

When in state 106 the hub identifies a registered device needing to be paired, it moves to a new state 108 in which the unpaired device is queried. The choosing of an unpaired device to be serviced can be at random, or by another ordering method, for example one that prioritizes the channel assignment of security devices over others. Such a querying is by way of the default channel, and accordingly the hub changes the transceiver used to match the parameters of that channel. In state 108 an acknowledgment request packet is sent to the unpaired device, again on the default channel, which will result in either receipt of a packet acknowledging the request or a timeout. The acknowledgment packet contains an identifier of the destination end-device, which may be the device's unique identifier (UID). A timeout indicates that the unpaired device is off, out of range or unavailable in some other way, and accordingly no further transaction attempts with that device are needed. The hub returns to the home state 102 on a timeout.

If the end-device is listening in state 152 on the default channel and receives a packet from the hub identifying the device as the destination, the device responds within a set time with a return packet in acknowledgment. Upon receiving that acknowledgment packet, the hub moves from state 108 to state 110 where a channel assignment may be made. Now, a state 110 where a channel is assigned is optional, where channel assignments have been made previously. Channel assignments are dependent upon the particular end-devices to be used with a hub, among potential other things. One assignment scheme is to segment the devices between those that will tolerate communication latency from those that won't, and assign channels for the latter. Another scheme assigns channels to battery-operated devices so as to keep traffic to and from other devices off-channel, potentially saving power. Where channel assignments are made on-the-fly, as might be done if a state 110 is included, channel assignments can be made to ones that are least-populated Other assignment schemes can be crafted in accordance with the network environmental conditions, the devices used, and other factors as desired.

Upon determination of a channel assignment, the hub then enters a state 112 to attempt to communicate that channel assignment to the as-yet unpaired device. A command is sent to the end-device to make the channel assignment, which is now in or now enters state 154 to engage the new assignment. Note that this command may be received while the end-device is listening generally in state 152, if the communications protocol allows. The channel assignment command may either contain the channel parameters as explained above, or it may be a reference to the parameters, for example in a table of channels indexed by a number. Upon receiving that command, the end-device preferably sends back and acknowledgment to the hub that the channel assignment is accepted, following which its RF circuitry is configured for operation on the assigned channel. If non-volatile memory is available, the new channel assignment may be saved at the same time. Once the channel assignment has been put into effect, the hub and end-device then proceed to states 114 and 156, respectively. If there is any remaining setup to be done, it can be managed through communications on the assigned channel with the hub and end-device in those states.

It will sometimes be important for the hub to test a channel assignment periodically, which is a kind of guarantee that an end-device is active and communicating properly. In state 114 the hub sends a "ping" to the newly-configured end-device, on the newly assigned channel. After engaging the assigned channel to its radio transceiver, the end device maintains it communications 156 on the assigned channel, and in many cases uses the assigned channel for all further communication with the hub until a reset or until a further channel assignment is made. Any packet returning a packet in response can act as a ping, and the hub may send pings when it is in the usual paired device servicing 104. The failure to receive a ping at an end-device within a set time may cause it to enter a fail-safe procedure, essentially returning to state 152. Similarly, the failure of an end-device to return a packet in response within a set time may indicate a failure of that device to communicate in the assigned channel, and the list of registered end-devices can be updated to indicate that a device is no longer paired or a channel assigned. As conditions change in the radio environment, new channel assignments can be made by the hub for an end-device by the issuance of a channel assignment command on the presently assigned channel, or by waiting for a fail-safe event at the end device and then following the procedure of FIG. 8.

Now turning to FIG. 11, a channel negotiation is represented using an asynchronous mode. In this example, the hub has a single transceiver that can switch between channels. In asynchronous mode, the hub in a normal state 202 scans through the assigned channels, waiting for transmission of a packet from a paired end-device. In some encoding schemes, including FSK, a packet under transmission can be detected by the presence of a signal for a short time, perhaps the length needed to transmit a single symbol. Note that it isn't necessary to scan any unassigned channels, that is channels that are available but for which no end-device as been commanded to operate on. While scanning the assigned channels, the default channel must be left unserviced. Periodically, however, the default channel may be serviced 204. If no activity is detected, the hub may return to servicing the assigned channels 202.

The end-device starts from reset and initialization 250, and as in synchronous mode if a channel assignment is stored in non-volatile memory the device may skip 251 the channel assignment procedure, going straight to setting the RF electronics parameters appropriately 256. If no channel assignment can be determined at reset, the end device proceeds to a hub-contacting state 254, in which the device attempts to be serviced by the hub. The end-device transmits packets intended for the hub, those packets including a unique identifier and indicating the presence of the end device on the default channel. Immediately following a service request packet, the end-device listens for a response.

Now in asynchronous mode there are two main failure modes of communication. The first of these is caused by the hub not being ready to receive a packet on the default channel, either because it is set to receive on another channel or because it is servicing other processing needs at the time. The second of these is from collisions, that is other end-devices that happen to transmit packets at the same time as the one attempting to be serviced. Either way, if an end-device doesn't receive a packet from the hub within a set time, a hold-off state 252 is entered to give the failure mode a chance to clear. The end-device remains in hold off state 252 for a period calculated to be likely to avoid the failure mode, for example an exponentially-increasing period with some randomization to avoid other-device collisions, following which the end-device returns to the hub-contacting state 254.

Eventually, the end-device will be successful in sending a service request to the hub. First, the hub verifies that the end-device's UID is in a list of registered end-devices. If a packet is received that is from a non-registered device, it is assumed to be registered with a different hub and ignored, in which case the hub returns to state 202 to service devices on a different channel while the default channel is occupied. If a packet is received from a registered device, a channel assignment is then determined 206 for the end-device that requested service, which is similar to that in the synchronous mode, and if a channel assignment has been made, the hub need only look up the channel or its parameters. Once a channel assignment has been determined for the end-device, the hub proceeds to state 208.

The hub in state 208 sends a packet back to the end-device containing a command with the channel assignment or the parameters thereof. Ordinarily it will be important for this determination to be made quickly, so the channel assignment command packet is sent promptly to the end-device, which is waiting for it after having sent the service request. Note, however, that it is possible to utilize a Cloud-access for the reading of the registry or the channel assignment, provided the end-device is configured to remain in state 254 for a longer period of time (perhaps seconds) before proceeding to the hold-off 252. Upon receipt of a channel assignment command, the end-device proceeds to state 256 where it switches its RF circuits to the new channel. If non-volatile memory is available, the new channel assignment may be saved at the same time. When done, the end-device proceeds to a normal operational state on the assigned channel 258. Any remaining setup to be done can be managed through communications on the assigned channel with the hub and end-device in that state.

In an optional confirming mode of operation, the hub switches to the assigned channel and then waits for a period of time 210 for a packet to arrive on that assigned channel from the end-device. That packet can be a simple ping, or it can contain further information, requests or a command response from the end-device. Regardless of whether the channel assignment is confirmed, the hub returns to normal operation and state 202 for further end-device servicing. Where the confirming mode is used, it is preferred that the end-device wait for a short and fixed period of time calculated to allow for the reconfiguration of the RF circuits before sending that packet so the hub can confirm and resume without unnecessary delay.

The LoRaWAN protocol, particularly Classes A and B, use a mode of communication similar to the asynchronous mode described above, although only on a single channel with a single set of RF communications parameters. With the use of channel assignments comes a problem not experienced in LoRaWAN networks, which is this: where there are end-devices that do not store channel assignments in non-volatile memory, a power interruption can cause a large number of coinciding service requests for channel assignment, which for the asynchronous mode can flood the default channel and cause packet collisions and large delays in the restructuring of the intermittent network when power is restored. Furthermore, as in asynchronous mode end-devices are not ordinarily aware of each other, a prioritized channel assignment restoration can be difficult, potentially resulting in long periods of unavailability for critical devices. For this reason, where there are to be mains-powered end-devices that do not save their channel setting to non-volatile memory, the synchronous mode of communication is preferred.

Furthermore, even though a hub and an end-device may use a synchronous or an asynchronous mode of communication while using a default initialization channel, that mode may be varied after a channel has been assigned and set. This may be particularly helpful for devices that have urgent data to submit, such as security alarms or critical equipment failure messages. For example, a battery-powered perimeter end-device might initially use a synchronous communications mode on an initialization channel, following which it operates on an operational channel reserved for security alarms in asynchronous mode, transmitting wireless packets immediately and without prompting by a hub in the event of intrusion detection, continuing until a hub acknowledges receipt.

In the description above, communications are largely sent in the clear permitting interception of packet data, which may permit an outside party to snoop on the channel assignment activity and potentially to interfere with channel assignments of end-devices. In this way, a malicious party might inject unauthorized commands into the network (for example commanding door latches to open), snoop on the state of alarms, or commanding end-devices to switch to faux channels effectively disabling them. For this reason it is desirable to include security measures in the communication protocols to prevent this kind of attack. If LoRa-compatible hardware is used, then one security measure is to use a network session or application key, by which packets can be encrypted and unauthorized packets rejected. An additional security measure encrypts the UID of devices, such that all nodes on an intermediate network require possession of a key to decrypt the identity of the source or destination end-device; in this way the UID is never sent in-the-clear, making the acceptance of faux packets much more difficult for a malefactor to achieve. In another security method where digital spread-spectrum transmission is used, the frequency sequence is changed periodically by the hub, through a command to change channel parameters that include a new seed for the pseudo-random generator used to generate the sequence. A return to the default channel provides a fallback state in the event a hub and an end-device lose synchronization.

In a further variation, an assortment of default channels can be assigned and configured at the time of manufacture, selectable by the consumer at the time of purchase without a configuration step. In one example, hubs and end-devices are made with a default channel being selected from n preset ones, with each device being set at random, by an even distribution, or by some other scheme. The products are made available with different product codes or names, such that a purchaser can select the correct one with his desired default channel. For example, a purchaser having set up a hub on default channel 2 would purchase end-devices set to the same, and thus the step of configuring the default channel by the installer is avoided, while at the same time conveniently permitting several intermediate networks to reside in the same radio locality with minimal interference on their respective default channels.

Channel Condition Measurement and Interference Countermeasures

An optimal channel is one that conveys information reliably and efficiently. In the real world there is background noise and sources of interference to overcome, so in practice an optimal channel is generally one that has the maximal data rate while at the same time keeping errors at a tolerable level. Conventionally, this balance is achieved by considering the worst circumstances foreseen within a specified environment and range, and setting communications parameters such that communication will never be unacceptable. Where intermediate-range networks are used, that practice can yield large inefficiencies in the use of a communications spectrum, as most of the time conditions will be much better than the worst.

In order to bring continuous efficiency, adaptive measures can be implemented. These consider the range of noise and interference that can be present, measuring them and changing communications parameters appropriately. For example, where two devices are communicating through an outdoor pathway, changes in humidity and precipitation will affect the attenuation of signals therethrough. Likewise, metal objects such as vehicles may be moved in the environment, changing reflections and changing blockages in the pathway. A network having a moving device included may similarly experience wide changes in signal-strength and other factors. Thus an intermediate network that can adapt to present conditions is more resilient and capable than one using conventional anti-interference measures.

Countermeasures to interference can be divided between those that use avoidance, and those that use redundancy. Both kinds of countermeasures can be used in an intermediate network, as will now become clear.

The avoidance strategy relies on the changing of frequencies or channels, essentially relocating devices in the spectrum to areas where the interference isn't present. This strategy is more effective against interference produced by collisions with other devices: if other devices are transmitting on the same channels at the same time, a relocation to a different channel may remedy the problem. This strategy is less effective, however, against situations where there are noise sources in the environment that are "bursty" (of short duration) or where the path between devices yields a low signal-to-noise ratio.

In contrast, the introduction of in-packet redundancy can help devices to overcome interference by extraction of duplicate information in spite of interference, which in many cases affect only a single bit of a packet or a large part thereof. Interference consisting mainly of small impulses, such as that produced by switches, motors and saturated amplifiers, can often be overcome by this method. Where large redundancies are used the random variations in the background noise, significant where a weak signal is present, may also be overcome. Collisions between devices that share a common format or protocol will remain out of reach though redundancy countermeasures, essentially because a receiver will not be able to discriminate between signals of co-transmitting devices.

Countermeasures using redundancy take a number of forms, but each essentially transmits information to be conveyed multiple times or in multiple formats, such that that information can be extracted even in the present of limited noise and errors. For example, single bit errors in a set of bits (a word or a byte) can be overcome through the use of forward error correction (FEC). In another example, a bit value may be transmitted multiple times, the receiver considering the value received the most times the one intended; this method is used in the LoRa protocol, the amount of redundancy applied being selected by the "spreading factor" setting. In contrast, the inclusion of a cyclic redundancy check (CRC) does not allow for recovery of error-modified packets, will require packet retransmission, and is not an effective redundancy countermeasure.

The use of a redundancy countermeasure necessarily introduces inefficiency in communication, as each datum requires a longer time in transit. For example, a packet using the LoRa specification and a spreading factor of 6 will require $2^6$ bit-sized slots to communicate each individual bit, making the time-in-transit 64 times longer than what would be needed if that redundancy were not used, making the time of channel occupation much higher. The use of redundancy to that particular degree, however, permits effective communications of a signal that is up to 15 dB weaker. Note that although the Semtech 127x components have circuitry onboard for this kind of redundancy, it can still be done in software, as can forward error correction and other redundancy-introducing methods. Likewise, redundancy to a lesser or a greater degree can be employed as needed. The use of lesser forms of redundancy is preferred, if conditions permit, because more devices can share a channel and latency will be reduced.

Figures 12, 13:
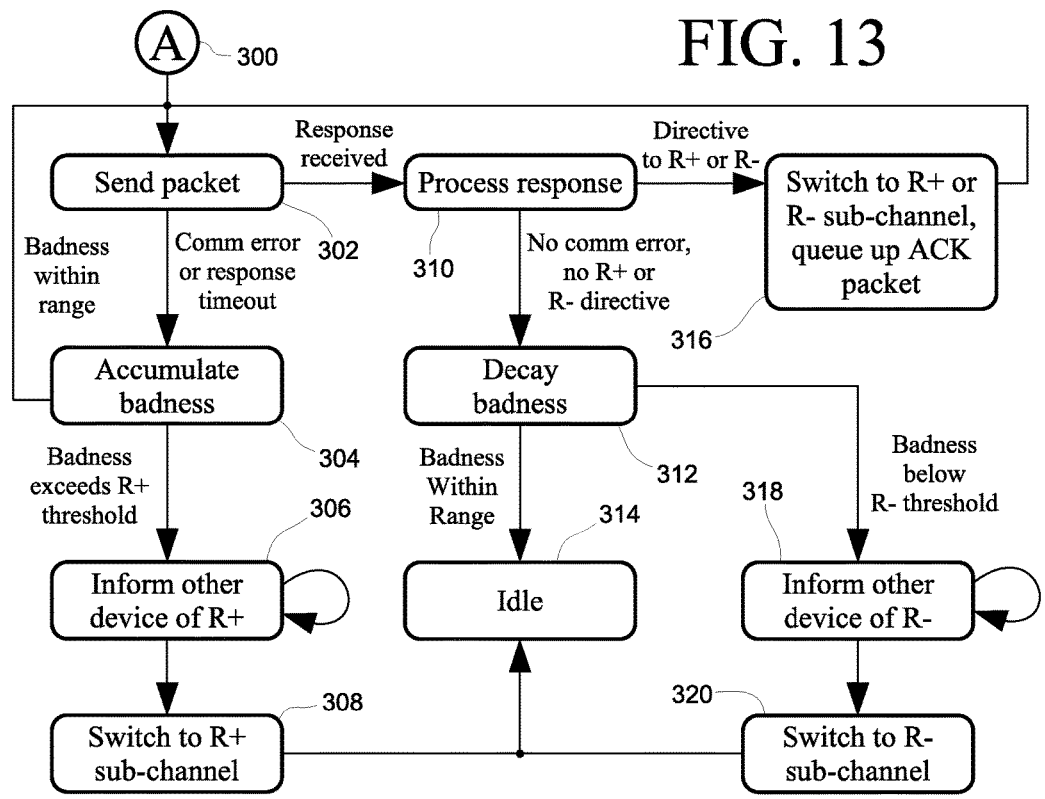
FIG. 12 illustrates a scheme of sub-channels organized under a set of base channels, the scheme including a redundancy parameter and directives for sub-channel switching.
FIG. 13 depicts a state machine permitting a quality measurement of a present operational channel and adaption to related sub-channels having varying amounts of redundancy.

Although there can be many channel schemes for use in the application of interference countermeasure adaption, it is preferred that one be set beforehand that provides a definite path from levels of redundancy. One such scheme uses groupings of sub-channels providing individual levels of redundancy, each organized under a set of base channels. Illustrated in FIG. 12 is such an organization usable with the transceiver hardware included within the Semtech 1272 components, providing for adaptive redundancy in a variable interference environment. In this exemplary scheme, 160 base channels are defined, each with a digital spread-spectrum frequency sequence. The RF spectrum from 902 to 928 MHz is divided up into 160 unique frequencies $F_0$ used in the preamble of packet transmission as described above, providing general orthogonality. With additional redundancy parameters, under each base channel are defined "BC+R" sub-channels A-F, the redundancy parameter being the spreading factor SF varying between 6 and 12, which provides for the duplicate transmission of each symbol between 64 and 4096 times. In this exemplary scheme the spreading factor SF=9 is not used, which could be reserved for other devices or purposes. Now there are other parameters that could be employed to make other sub-channels, such as a bit rate or an FEC setting, but to provide simplicity of discussion the example shown here only uses the spreading factor to provide variance in redundancy.

Each BC+R sub-channel contains R+ and R− directives used to guide devices when making changes to redundancy in adaption. So, for example, a device operating on sub-channel A and determining that more redundancy is needed would apply the R+ directives and switch to sub-channel B, changing the spreading factor from 6 to 7. Similarly a device operating on sub-channel D would move to sub-channel C if less redundancy was needed, changing the spreading factor from 10 to 8. Other methods can be employed to calculate a sub-channel for future use, but it is expected that a table such as that shown will suffice for most applications. It is further to be understood that although these BC+R channel sets as shown share a common $F_0$ frequency, that is not required. Any channel can be made a part of such a channel set using any frequency, frequency sequence, or other parameters, such that R+ and an R− steps can be taken that generally provide increased or decreased redundancy to the devices in use.

Also in the scheme of FIG. 12, a fail-safe "FS" sub-channel is included where a device can resort in the event that contact is abruptly lost with a paired device, such as could happen if a source of interference was suddenly introduced. Here the FS settings are for sub-channels C and F; as sub-channel C is much faster than the highly redundant sub-channel F, it is the first resort where low-levels of redundancy have been needed. In an alternative, a fail-safe sub-channel could be omitted, relying on an expectation that channel conditions are likely to improve or a packet retry will eventually get through.

The initial sub-channels may be selected as desired. In one example, the fail-safe channel having the greatest redundancy is used on power-on and reset. This provides for two devices to connect and synchronize communications on power-on or at loss-of-communication, without the involvement of other end-devices or hubs. In another example, the initial sub-channels may be set by a hub as shown and described in connection with FIGS. 10 and 11, in conjunction with or in substitution of an operating frequency, as desired. The specific way that initial sub-channels are selected is not critical, it is important only that devices to communicate synchronize on a common communications channel.

Turning now to FIG. 13, a state machine is shown that may be implemented within a device in an intermediate-range network, a device in this context being any device including a hub, an end-device, etc. with tolerance to packet communication failures requiring a transmission retrial. This state machine is suitable for devices that should manage the redundancy on their channel with another paired device, e.g. ones that do not receive promptings from third devices to change channel parameters as interference changes over time. The state machine shown is suitable for two devices transmitting asynchronously; it can be used with minor modification for synchronous channel operation.

Discussion of this state machine begins at an initial state 300, which includes any state of a device where a packet is ready to be sent to a paired device. When that occurs, the packet is attempted to be sent 302, and a response is attempted to be received from the other device. The result of that will be either the reception of a valid response, or a timeout or other communications error. Validity may be determined by a CRC value and by the correctness of the content of a response, for example. Each result is an indicative datum of measurement quality, and accordingly the state machine applies a different operation depending on the result of a communication attempt.

In the event that a valid response is not received, state 304 is entered for a modification to the "badness" calculation of the channel. For the purposes of this state machine, badness is a numeric value with a higher value indicating that the channel being used is less reliable. The calculation of this value will be described shortly. Following the modification to the badness value, the machine branches depending upon whether that value exceeds a threshold indicating that movement to a more reliable channel or sub-channel should be made. If the value is less than a threshold (the R+ threshold), the present channel is considered not to yet be sufficiently proven unreliable, and the machine returns to state 302 for another attempt to send the latest outbound packet.

If the R+ threshold is exceeded, then a change to a channel with higher redundancy is considered needed. The destination channel is identified, for example through a lookup in the table for the R+ channel from the present one in a table as shown in FIG. 12. A state 306 is then entered in which the device on the other side of the channel is informed that the present device is moving to the R+ channel. As the state of the present channel is considered to be unreliable at this point, it is preferred to continue attempts to inform the other device until an acknowledgment is received or a fail safe timeout occurs. When an acknowledgment is received, the device enters state 308 to configure the local transceiver for operation on the identified R+ channel, and the device returns to state 302 to transmit the packet that failed to be passed. In an alternative, the device can continue to retry transmission of a failed packet, entering state 306 after transmission success has occurred. After changing to a different channel, it is preferable that the badness value be either set to zero or lowered significantly allowing for further action to be taken more rapidly, in the event that the destination channel proves to be unreliable as well.

Returning to state 302, if a valid response to a packet transmittal is received, that response is processed in state 310. There are a number of possible successive states and actions possible, depending upon the content of the response. If the device on the other side of the link is permitted to modify the redundancy in the channel, the response may contain a directive to change the communications channel. If that is the case, state 316 is entered in which the transceiver parameters are changed, and an acknowledgment is queued up to be sent to the other device, if needed.

If after processing in state 310, there is no directive to change channel, state 312 is entered where the badness value is decayed. This decaying operation permits the value to decrease over time as communications are successful, which has the effect of filtering out sporadic packet errors. Assuming no new threshold applies, the state machine may enter an idle state 314 or proceed to do processing apart from packet communication and processing.

The presence of states 304 to 312 provides for a controlled increase in redundancy, but it does not permit a return to a more efficient channel where interference conditions improve. For example, where a pair of devices are located at long distances, the presence of water vapor and precipitation can attenuate signals to the point that redundancy would be needed. A storm may pass, and the signal path may be restored. Where devices are only permitted to mitigate down to lower transmission rates, inefficiencies will be unnecessarily retained in communication. Therefore, built into the state machine of FIG. 13 is an optional means of reducing redundancy and increasing data rates.

Returning to state 312, the badness value is decayed, indicating that the present channel is more reliable. A comparison may be made against an R− threshold, set at such a level that substantially some number of decay operations without communication errors are detected. When the badness value is decayed below the R− threshold, state 318 is entered wherein the device on the other end of the channel is notified of a switch to a less-redundant and more efficient channel, which could be selected from the R-column a the table of the form of FIG. 12. Following successful notification, the device's transceiver is set up for the new channel 320, following which the idle state 314 may be entered. A state machine such as the one of FIG. 13 relies on a correlation between the presence of interference on two adjacent channels of higher and lower redundancy, which has the advantage that a device with a single transceiver can stay on one channel continuously, possibly avoiding the missing of packets from another device transmitting on that channel. It is possible, however, that two such channels may not be so correlated; therefore if it is noticed that the device frequently "bounces" between two channels, further steps can be taken such as a reduction in the rate of decay or a lowering of the R− threshold.

The setting of threshold, accumulation and decay values is something that should be carefully set. FIG. 14 is an exemplary graph of extreme encounters with interference and clearance of interference, which assists in the understanding of the proper setting of values. Shown in the graph is an exemplary badness value through time in a first stage of accumulation followed a longer period of decay, modified through states such as 304 and 312 shown in FIG. 13. In the graph, each step represents one procession through state 302 where the sending of a packet is attempted. A badness value and others could be represented in floating point and changes thereto could follow a logarithmic curve, but recognizing that using an integer value is more fitting for a microcontroller or a logic environment, the discussion here will speak of integer settings and simple linear movement.

There are two settings illustrated in the graph, which are a step value used for accumulation "A", and a step value used for decay "D". Ordinarily D will be set to be much less than A, so that the reaction time in the presence of interference is fast, and movement toward a less redundant channel is slow, providing a filtering effect. In this way packet retries can be minimized, even though movement to a potentially problematic state with less redundancy is available. In the example, A is set to be four times D (as shown by the dashed line); it may be desired to increase that ratio so that R− movement doesn't happen before interference is allowed to clear. In the example, the threshold R+ is set to four times the A accumulation value, which provides for no more than four successive retry attempts to trigger a change to a channel with higher redundancy. In ordinary operation, the badness value would float downward where the ratio of successful communication exceeded 4:1, and upward toward a switch to an R+ channel otherwise. A threshold R− can be set if desired: here that value is merely set at 0.

The settings used may be specific to a type of device or application. For example, in a crowded environment it is preferable to minimize occupation on a channel, and for devices that will tolerate multiple retry attempts and long latentcies, a large number of retries on a channel with low redundancy is acceptable. For such, smaller values of A and larger R+ thresholds may be better. Other devices have a low tolerance for packet transmission retries. For these, larger values of R+ and higher ratios between accumulation and decay values are more appropriate. It would not be unusual to undertake experimentation in these settings to reach optimality.

It is preferable that packets be sent at regular times, and if packets are not needed for device operation, NOP or ping packets can periodically be sent and acknowledged such that the quality of the channel under use can be up to date. However there are some devices that will tolerate a large number of retries while a redundancy setting is increased or decreased, and for those devices periodic packets may not be beneficial.

In order to properly apply countermeasures and redundancy with minimal impact, it is necessary to assess the condition of a communications channel. There are sometimes means of gathering information provided with a transceiver circuit to do so, for example the reading of a value on an automatic gain control amplifier or a signal-to-noise (SNR) meter. The Semtech 127x transceivers have a value that can be read that gives an estimate of the SNR of the last packet received, another value for signal strength, and a flag that detects activity on a channel. Although these can be used under good conditions to detect collisions and overall signal strength to some extent, they do not work under all circumstances, do not provide values directly correlatable to errors and it is not preferred to rely solely upon these values in the determination of a proper redundancy setting. The use of a running badness value as described above provides a metric directly related to the channel condition, which metric can be used alone or in combination with other metrics, as desired. Where collisions with other devices can be positively identified as the source of error, it may be preferred to change a base channel such that a different frequency or frequency pattern is used, rather than increase a badness value or redundancy.

User Indicators of Redundancy and Associated Delays

One of the consequences of adaptive redundancy is the possibility of wide latency variances. Latencies may be introduced for reasons that aren't apparent to ordinary users. People may not realize the impact of present conditions to the operation of an intermediate-range network, which may get better or worse depending upon factors such as the weather and what vehicles are parked close to devices or in a path of communication. Where conditions remain constant, users will get used to having their electronic devices work with a constant delay, slowly or promptly, and correspondingly if that delay changes those users will likely perceive that something is wrong. Using the Semtech127x transceivers as an example, if a spreading factor is allowed to vary between 6 and 12, the time used for packet transmission will range from milliseconds to several seconds.

A couple of methods of avoiding this perception of broken-ness is to put devices on channels that have low interference, or simply to not use redundancies that introduce a perceivable delay. That is not always possible, so such methods may not be effective, for example where devices are located near the maximum operable range. It may be more important that devices function and continue to remain in communication than to operate quickly and promptly, and a design choice can be made to operate over a slow but reliable link, rather than a fast but unreliable one.

Where that is the case, it may be beneficial to include an indicator external to a device that offers a user an expectation of a delay. Take, for example, the pair of devices illustrated in FIG. 15. A first end-device 330 is paired with a second end-device 331, the second receiving information from the first to control a mechanism, such as an entry door latch. Devices 330 and 331 operate with adaptive redundancy as described above, either device or both controlling the amount of redundancy on-channel. In this example, the first device 330 includes a housing 332 and a keypad 333 and indicators 334 visible from the outside of the housing. Devices 330 and 331 are located some distance away, within intermediate-range.

In an exemplary installation, the first keypad device 330 is located at a security station in one building, and the second latch device 331 controls entry to a doorway in another distant building. Keypad device 330 operates in asynchronous mode, sending packets some of which contain either an entered code or a validation code to latch device 331, upon which the latch device 331 sends status codes in return with the open/closed state of the latch. Both of devices 330 and 331 could be powered off of the mains or batteries, as appropriate. The operation of device 331 is relatively simple, controlling a door latch and responding to wireless inquiries from the keypad.

The functioning of keypad device 330 has a little more complexity, for it must not only communicate with device 331, but also read keypad 333 and control indicators 334. In this example indicators 334 are LED lights visible through the housing, and may be continuously lit or may be darkened after some period of inactivity. Indicators 334 in this example include one displaying whether the device is powered, and one that lights when a connection has been made and is maintained with device 331, regardless of any redundancy applied in the channel. This example includes an indicator showing whether or not the remote door-opening latch is activated, which would ordinarily stay dark unless the door-opening procedure is engaged. And finally there is a "be patient" indicator showing whether there is an appreciable delay or latency in the communication link between the keypad device 330 and the latch device 331. It is to be understood that in this description the words "be patient" are merely descriptive of a function of a kind of indicator, and other words may be used to convey the same or similar indications to a user.

In using keypad device 330, a person enters a code on keypad 333. At that point there are two ways of managing the entry. The first is simply to send the entered code directly to the other device 331, where it may validate the code at that location. The other way is to check the code at device 330, and send a separate activation command to the other device 331. As each key is depressed, the keypad device 330 may emit a beep or light another indicator if desired. At the time that the entered code or activation code is sent, keypad device will light the "be patient" indicator, but only if the communications channel is operating with selected higher-redundancy channel parameters causing an appreciable latency. In one mode of operation, that indicator will stay lit until communication is complete with device 331, that is until device 331 returns a packet informing that the controlled latch is open. Device 330 will light and darken the "Activated" indicator as updated state is received from device 331. In an alternate mode of operation, device 330 may light the "be patient" indicator at all times when higher-redundancy parameters are being used, regardless of whether the keypad has been recently used or whether it remains idle.

The determination of when to light a "be patient" indicator can be made in a number of different ways, while still maintaining a correlative relationship to a degree of redundancy being used. A preferred method is shown in FIG. 16, which is an exemplary variation to the table as shown in FIG. 12, but with each BC+R sub-channel definition is included an additional "IN" flag or value that determines whether the "be patient" indicator should be lit. In the example particular sub-channels are pre-selected to be in the class where the indicator should be active, here where sub-channels D-F are in use.

In another method, applicable specifically where the Semtech 127x components are used in LoRa mode, the determination of when to light a "be patient" indicator is made when a particular spreading factor is in use. Thus it may be decided that a constant bandwidth should be used, and that spreading factors above 9 introduce a perceptible delay significant enough to light the indicator. An another method, the determination is made from a calculation of the time-in-transit of a symbol, a bit or a packet. One such calculation uses the redundancy introduced by a spreading factor in combination with other parameters that produce an effective bit rate, which calculation determines the activation of the indicator when such a calculated bit rate is below a threshold. So, for example, assuming other parameters remain constant, an effective bit rate of 200 bits per second or below may determine the lighting of the indicator. A designer should allow for time to perform such calculations, if that kind of method is used.

In another method, a value from a thresholded method as described above is first determined, and then the present badness value is combined to render a final determination. This method considers that the actual delay experienced by the user will include any retry packets needed. Thus where a badness value is increasing beyond a certain pre-determined amount, it is likely that packet retries will extend the reaction time of the devices involved even though a responsive spreading-factor or other redundancy component may be in use that would not otherwise trigger the lighting of the indicator. In rendering such a combined value, an additive method can be used, for example adding the spreading factor to the badness value using the state machine of FIG. 13. The combination may also be an 'or' operation, that is activating the indicator if either the redundancy or the badness value is high. Other combinations may be devised to serve particular applications and environments as needed.

In another method, a "be patient" indicator uses a measured time of latency over a previous number of packet exchanges, that is the time needed for a device to transmit a packet and receive one in response, whether such exchanges are caused by the entry of a code, a ping timeout, or some other event. For example, a device might consider the time needed for each of the last five packet exchanges, and light the indicator if the average or the maximum of those exceeded two seconds. Any metric of the time of communication could be used in such a way.

In another method, a flag is received from the device on the other side of a communications link, which is incorporated into a determination of whether to light the indicator. In the example of FIG. 15, the latch device 331 would render its own determination of excess latency, which could be done by any of the above methods or by another. For example, a distant device such as 331 could detect that the same commands are being sent by a controlling device such as keypad device 330 in close temporal proximity, indicating that some of the response packets being sent by the distant device aren't being received. A packet received by a indicator-incorporating device may contain such a flag, and the indicator may be lit if the flag so indicates.

The exemplary "be patient" indicator of FIG. 15 provides a binary indication using a single-color LED, but that can be varied. In another example, the indicator is a bi-color LED, each color indicating a level of redundancy and delay. In another example, the indicator uses several levels of light intensity to indicate such a level. In yet another example, the indicator is a bar graph, numeral or other multi-level indicator. Where more that one level may be indicated, the level may represent many values of redundancy. In one example, the level to be displayed is included in a table such as the "IN" value depicted in FIG. 16 for each sub-channel. In other examples, the level displayed is calculated from a value correlated to redundancy, such as the currently-used spreading factor minus 9, the average time needed for recent packet exchanges in seconds or a portion thereof, or the number of retries needed in the last n packet exchanges. Other multi-level indications may be used, provided that they are viewable from the exterior of a device and represent the amount of redundancy or latency in communication.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. Some of the descriptions herein refer to specific protocols and modulation types, which are only exemplary; other protocols and types may be substituted as desired in accordance with the inventive concepts. More specifically, it is to be understood that although the accompanying description makes reference to the LoRa and LoRaWAN protocols and designs, the inventions described herein may be used in other kinds of intermediate-range networks, RF bands and using other equipment. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A system of devices operable at intermediate ranges utilizing a set of discrete radio-frequency channels organized into a plurality of base channels and sub-channels assigned to the base channels, the sub-channels providing a range of redundancy options under a base channel, said system providing adaptation for changing conditions of interference in a wireless environment, said system further providing an indication of latency due to an application of higher levels of redundancy, said system comprising:
a first and a second wireless devices, each of said devices comprising (i) a radio-frequency transceiver functional for wireless communication over the set of discrete radio-frequency channels, (ii) a non-volatile memory wherein is stored a set of channel parameters corresponding to the set of discrete radio-frequency channels, and (iii) an electronic circuit implementing a state machine immutable to power-transient events;
wherein the state machine of each of said devices is configured to perform the functions of:
(a) initializing electronic circuit and radio-frequency transceiver of the device into a power-on state, the power-on state configuring said radio-frequency transceiver to operate on an initial sub-channel,
(b) setting a base channel, and
(c) configuring the transceiver of the device to operate on a selected sub-channel, where a sub-channel has been selected following the making of an indication of increased redundancy;
further wherein the state machine of at least one of said devices is further configured to perform the functions of:
(d) retaining a badness value for the sub-channel presently configured,
(e) detecting errors in packet communication,
(f) applying accumulation to the badness value where errors are detected,
(g) decaying the badness value where packet transmissions occur without an error detected,
(h) applying an R+ threshold to the badness value, such that where the badness meets or exceeds the R+ threshold an increase in redundancy is indicated, and
(i) where an increase in redundancy is indicated, selecting a sub-channel having increased redundancy than the sub-channel for which said transceiver is presently configured;
wherein the first of said devices has incorporated thereto an indicator viewable from the exterior of said first device; and
further wherein the state machine of said first device is configured to perform the functions of:
(j) determining the output state of said indicator, said determination using as a basis present channel parameters being used in communication with said second device, said determination being correlated to the latency experienced in communication with said second device, and (k) controlling the state of said indicator using determinations made, such that a person viewing said indicator can discriminate conditions of latency in the communication between said first and second devices.

2. The system according to claim 1, wherein said first device incorporates a user-input device.

3. The system according to claim 2, wherein said user-input device is a keypad.

4. The system according to claim 1, wherein said second device incorporates a controlled mechanism.

5. The system according to claim 4, wherein said controlled mechanism is a door latch.

6. The system according to claim 1, wherein the function of determining the output state of said indicator is made on the basis of a sub-channel in use.

7. The system according to claim 1, wherein the function of determining the output state of said indicator is made on the basis of a badness value.

8. The system according to claim 1, wherein the function of determining the output state of said indicator is made on the basis of a measurement of latency over a selected number of packet exchanges.

9. The system according to claim 1, wherein the function of determining the output state of said indicator is made on the basis of information received from said second device.

10. The system according to claim 1, wherein said indicator is a binary indicator.

11. The system according to claim 1, wherein said indicator is a variable indicator that provides more than two output states.

12. The system recited in claim 1, wherein said first device is configured to send periodic ping packets.

13. A system of devices operable at intermediate ranges utilizing a set of discrete radio-frequency channels providing a range of redundancy options, said system providing adaptation for changing conditions of interference in a wireless environment, said system further providing an indication of latency due to an application of higher levels of redundancy, said system comprising:
a first and a second wireless devices, each of said devices comprising (i) a radio-frequency transceiver functional for wireless communication over the set of discrete radio-frequency channels, (ii) a non-volatile memory wherein is stored a set of channel parameters corresponding to the set of discrete radio-frequency channels, and (iii) an electronic circuit implementing a state machine immutable to power-transient events;
wherein the state machine of each of said devices is configured to perform the functions of:
(a) initializing the electronic circuit and radio-frequency transceiver of the device into a power-on state, the power-on state configuring said radio-frequency transceiver to operate on an initial channel,
(b) configuring the transceiver of the device to operate on a selected sequential channel, where a sequential channel has been selected following the making of an indication of increased or decreased redundancy;
further wherein the state machine of at least one of said devices is further configured to perform the functions of:
(c) detecting errors in packet communication between said first and second devices, and
(d) adjusting redundancy in the communications between said first and second devices to adapt to current conditions of interference in a local wireless environment;

wherein the first of said devices has incorporated thereto a user-input device and an indicator viewable from the exterior of said first device;

wherein the second of said devices has incorporated thereto a controlled mechanism; and further wherein the state machine of said first device is configured to perform the functions of:

(e) determining the output state of said indicator, said determination using as a basis present channel parameters being used in communication with said second device, said determination being correlated to the latency experienced in communication with said second device, and (f) controlling the state of said indicator using determinations made, such that a person viewing said indicator can discriminate conditions of latency in the communication between said first and second devices.

14. The system according to claim 13, wherein the function of determining the output state of said indicator is made on the basis of current communications parameters in use.

15. The system according to claim 13, wherein the function of determining the output state of said indicator is made on the basis of a badness value.

16. The system according to claim 13, wherein the function of determining the output state of said indicator is made on the basis of a measurement of latency over a selected number of packet exchanges.

17. The system according to claim 13, wherein the function of determining the output state of said indicator is made on the basis of information received from said second device.

18. The system according to claim 13, wherein said indicator is a binary indicator.

19. The system according to claim 13, wherein said indicator is a variable indicator that provides more than two output states.

20. The system according to claim 13, wherein said user-input device is a keypad and further wherein said controlled mechanism is a door latch.

* * * * *